E. E. WEAVER.
SPRING TENSIONING MECHANISM.
APPLICATION FILED APR. 6, 1920 RENEWED SEPT. 13, 1921.
1,401,842.
Patented Dec. 27, 1921.
2 SHEETS—SHEET 2.
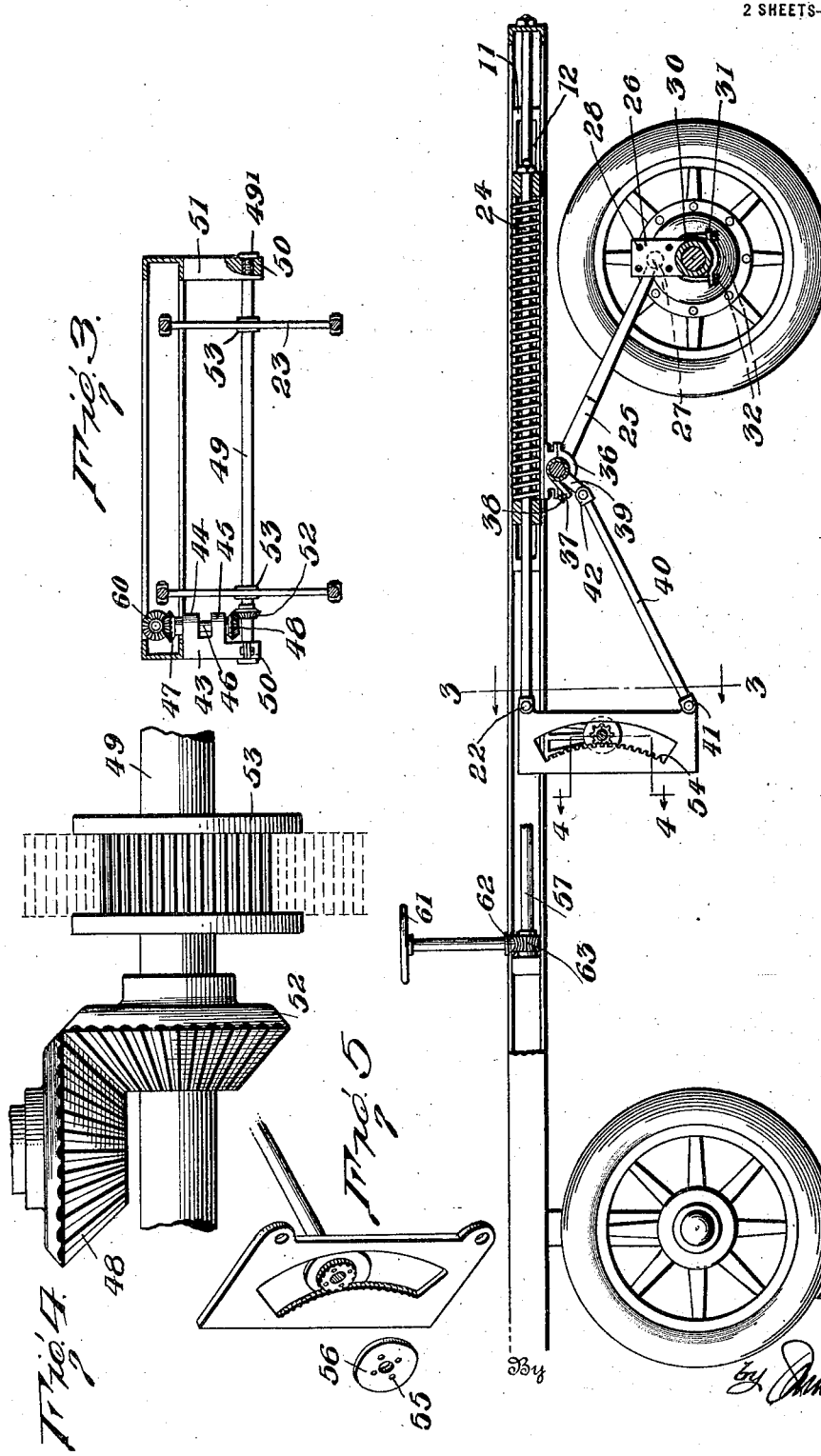

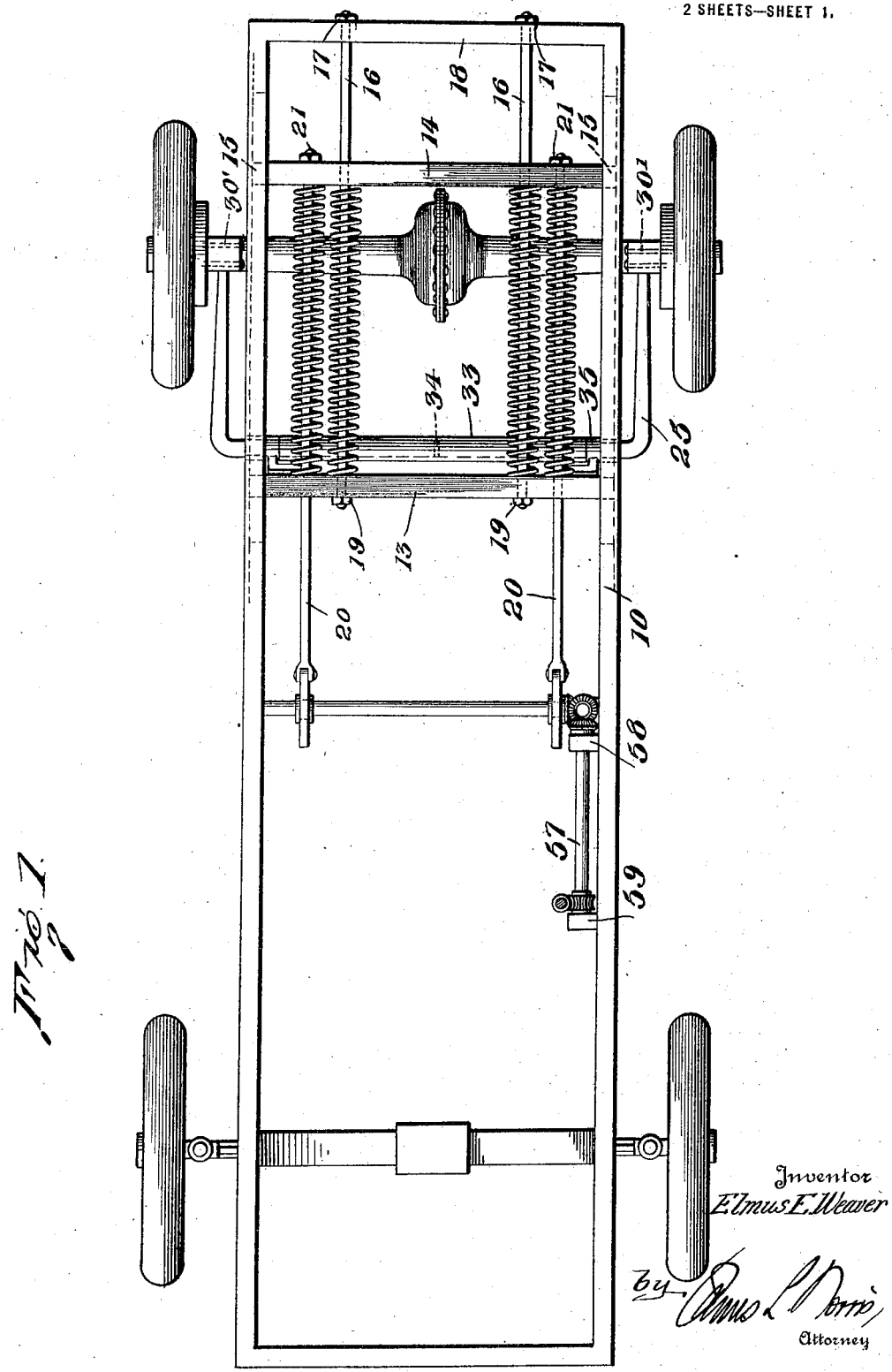

UNITED STATES PATENT OFFICE.

ELMUS E. WEAVER, OF BOISE, IDAHO, ASSIGNOR TO WEAVER SPRING COMPANY, OF BOISE, IDAHO, A CORPORATION OF IDAHO.

SPRING-TENSIONING MECHANISM.

1,401,842.   Specification of Letters Patent.   Patented Dec. 27, 1921.

Application filed April 6, 1920, Serial No. 371,647. Renewed September 13, 1921. Serial No. 500,438.

*To all whom it may concern:*

Be it known that I, ELMUS E. WEAVER, a citizen of the United States, residing at Boise, in the county of Ada and State of Idaho, have invented new and useful Improvements in Spring-Tensioning Mechanism, of which the following is a specification.

This invention relates generally to improvements in spring suspension mechanism for vehicles and more specifically to improvements in the tensioning means employed in connection with spring suspension mechanisms of the types disclosed in my co-pending applications Serial Numbers 311,759, filed July 18, 1919, and 371,646, filed April 6, 1920.

The object of the invention is to provide a simple device than can be readily clamped or otherwise secured to the frame of a vehicle for the purpose of adjusting the tension of the supporting springs in a convenient and effective manner.

With this and other objects in view my invention consists of certain new and useful constructions and combinations of parts as will be hereinafter more fully described and pointed out in the claims.

In the accompanying drawings:—

Figure 1 is a plan view of the chassis of a vehicle having my improved mechanism applied thereto.

Fig. 2 is a partial sectional view.

Fig. 3 is a transverse sectional view on the line 3—3 of Fig. 2.

Fig. 4 is an enlarged sectional view on the line 4—4 of Fig. 2, showing a portion of the actuating gearing.

Fig. 5 is a detail perspective view of the tensioning plate.

On reference to Fig. 1, it will be seen that the ordinary channel frame or chassis of a motor vehicle is illustrated at 10. Suitable filler pieces 11 having longitudinal slots 12 formed therein are disposed between the flanges of the channel sides of the chassis. Front and rear cross-head members designated 13 and 14, respectively, are provided with reduced ends which slidably fit within said slots. Rods 16 having integral heads 17 extend through alining apertures in the rear frame pieces 18 and cross-heads 14, 13. The forward ends of these rods are threaded for receiving adjusting nuts 19. Rods 20 having integral heads 21 extend through alining apertures in the cross-heads 14, 13 and are forked at their forward ends to receive the upper ends of swinging plates 23 to which the rods are pivotally secured by pins 22. Coil springs 24 are mounted on the rods 16 and 20 and compressed between the two cross-heads 13, 14.

L-shaped rods 25 extend from bearings 26 secured to the rear axle of the vehicle near each end thereof. The bearings 26 are made in two parts, each part being formed with a hemispherical socket for receiving the ball ends 27 of the rods 25. The two parts of the bearings 26 are detachably secured together by suitable fastening devices 28. The bearing parts are also each provided with flanges that conform to the curvature of the rear axle or rear axle housing and U-bolts 30 engage these flanges and firmly hold the bearing in place by means of the bent straps 31 and nuts 32. A bolt 30' is also passed transversely through the hub of the rear axle casing to prevent turning movement of the bearing.

One arm of each of the L-shaped rods 25 extends through a sleeve 33, the opposing ends of the rods being spaced apart as shown at 34. Collars 35 are secured to the rods 25 and are located in bearing members 36 secured to the frame 10 of the vehicle and thus supply journal members for said rods. An L-shaped arm 37 projects from each collar 34 and partially overlies an arm 39 extending from the sleeve 33. The L-shaped arm is provided with a threaded aperture through which a set screw 38 is inserted for engaging the arm 39.

A link 40 connects each arm 39 and a split socket bearing 41 at the lower end of the plate 23. The connection 42 between the link 40 and arm 39 is also preferably of the ball and socket type.

A bracket 43 having the spaced apertured lugs 44, 45 is secured to one side piece of the frame. A vertical shaft 46 journaled in these bearings has bevel gears 47 and 48 secured to its upper and lower ends, respectively. A transverse shaft 49 extends through suitable bearings 50 detachably secured to the lower end of bracket 43 and the lower end of a bracket 51 attached to the channel frame opposite said bracket 43. A bevel pinion 52 is fastened to shaft 49 so as to mesh with pinion 48. Spur gears 53 are also secured to this shaft in proximity to the opposite frame members.

Each plate 23 is provided with an arcuate slot of such lateral dimension as to receive one of the gears 53 therein and allow a slight clearance. The forward arcuate face of the slot is formed with gear teeth 54 thereby constituting a gear sector in mesh with a gear 53. Each gear 53 is formed with apertures adapted to aline with apertures 55 formed in flanges 56. Fastening devices such as bolts (not shown) pass through these apertures and maintain the flanges in contact with each face of the plate 23 thereby restraining the plate from lateral motion. Collars 49' threaded into each end of shaft 49 take the end thrust on said shaft.

A shaft 57 rotatably mounted in suitable bearings 58 and 59 secured to a side member of the chassis of the vehicle normally co-operates with bevel pinion 47 through bevel pinion 60 in mesh therewith and secured to the shaft. A hand wheel 61 disposed in convenient reach of the driver of the vehicle communicates its rotary motion to shaft 57 through the instrumentality of worm 62 mounted on the shaft of the hand wheel and worm wheel 63 secured to shaft 57.

It will be understood that the load and relative vertical movements between the frame of the vehicle and rear axle are communicated to the springs, through rods 25, sleeve 33, links 40, plates 23 and rods 20. Rods 20 exert a pull on cross-head member 14 which compresses the springs located between cross-heads 13 and 14. If it is desired to adjust the tension of the springs it is only necessary to turn the hand wheel in proper direction, in which case, the ends 22 and 41 will swing correspondingly and uniformly release or add compression to the springs. During this action plates 22 swing about gears 53 as pivots and for the slight range of adjustment required the ends 22 and 41 maintain practically their same horizontal positions and move either forward or backward. The rods 20 and 40 always exert a pull on the plates 23 so that the gear sectors will be maintained in mesh with the gears 53. The adjustment of plates 23 also involves a change in the upper and lower lever arms so that a slight change in position of the plate 23 gives a considerable variation in the tension.

I claim:

1. A tensioning device comprising two members, spring means interposed between said members, means for maintaining one of said members in position and mechanism for adjusting the position of the other of said members comprising gear sectors, gears meshing with and forming pivots for said sectors and means for rotating said gears.

2. A tensioning device comprising an adjustable member and a movable member having spring means therebetween, a plate having an arcuate slot therein, gear teeth on one face of said slot, a gear meshing with said gear teeth, a connection between said plate and movable member and means for rotating said gear whereby said plate is moved about said gear as a pivot.

3. A tensioning device for the spring supporting means of a vehicle, comprising the combination with the spring means, of a plate having an arcuate slot, gear teeth on one face of said slot, a gear meshing with said gear teeth, a rod connected with the spring means and plate, an oscillatory arm, means tending to rotate said oscillatory arm in one direction in opposition to the spring means, a link pivotally secured to said plate and said arm, and mechanism for rotating said gear whereby said plate pivots about said gear for adjusting the tension of the spring means and changing the angular relation of said plate relative to said rod and link.

4. A tensioning device for the spring supporting means of a vehicle comprising the combination with the spring means, of a plate having a gear sector, a gear meshing with said sector and forming a pivot for said plate, an oscillatory arm, means tending to rotate said oscillatory arm in one direction in opposition to the spring means, connections from said sector at opposite sides of said gear to the spring means and said oscillatory arm, respectively, and means for rotating said gear whereby said plate moves about said gear as a pivot and changes the lever arms of said connections.

5. A tensioning device for the spring supporting means of a vehicle, comprising the combination with the spring means, of a plate, means connecting said plate to the spring means and to a load opposing said spring means, respectively, a rotatable pivot for said plate located between said connecting means for imparting movements of rotation and translation to said plate whereby the resultant of said motions is imparted to said connecting means.

6. A tensioning device for the spring supporting means of a vehicle, comprising the combination with the spring means, of a plate, an oscillatory arm, a rotatable pivot for said plate, means connecting said plate and the spring means at one side of said pivot, a link connecting said arm and plate at the other side of said pivot whereby a rotation of said pivot imparts rotary movement to said plate and changes the lever arms of said connections.

7. A tensioning device for the spring supporting means of a vehicle, comprising the combination with the spring means, of a plate having an arcuate slot therein, gear teeth on one face of said slot, a gear meshing with said gear teeth, an oscillatory arm, connections from said plate at one side of said gear to the spring means and at the other side to said arm, respectively, whereby said gear teeth are constantly maintained in mesh with said gear and means for rotating said gear for imparting pivotal movements to said plate.

8. A tensioning device for the spring supporting means of a vehicle, said means being horizontally disposed between a stationary and a movable member, comprising vertically movable pivoted plates arranged near opposite sides of the vehicle and means for rotating said plates to the same degree and connections from said plates to the movable member for imparting the same adjustment to all the springs between said members.

9. A tensioning device for the spring supporting means of a vehicle comprising a vertically movable pivoted plate, an oscillatory arm, means connecting said arm and an axle of the vehicle tending to rotate said arm in opposition to said spring means, a connection from said plate to the spring means on one side of the pivot and from said plate to the oscillatory arm on the other side of the pivot, and means for rotating said pivot.

10. A tensioning device for spring means comprising a vertically movable gear sector, an oscillatory arm, means tending to rotate said arm in opposition to the spring means, a connection from said sector to said arm, a connection from said sector to the spring means, and a gear in mesh with said sector between said connections for imparting rotary movement to said sector.

In testimony whereof I have hereunto set my hand.

ELMUS E. WEAVER.